US011961039B2

(12) United States Patent
Jiang et al.

(10) Patent No.: US 11,961,039 B2
(45) Date of Patent: Apr. 16, 2024

(54) LINKED BLOCKCHAIN STRUCTURES FOR ACCELERATED MULTI-CHAIN VERIFICATION

(71) Applicant: International Business Machines Corporation, Armonk, NY (US)

(72) Inventors: Jing Bo Jiang, Beijing (CN); Li Ni Zhang, Beijing (CN); Li Jiang, Beijing (CN); Yu Zhao, Beijing (CN); Lan Luo, Beijing (CN); Li Long Chen, Beijing (CN); Wen Rui Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 16/183,062

(22) Filed: Nov. 7, 2018

(65) Prior Publication Data

US 2020/0143323 A1 May 7, 2020

(51) Int. Cl.
*G06Q 30/01* (2023.01)
*G06F 16/23* (2019.01)
(Continued)

(52) U.S. Cl.
CPC ..... *G06Q 10/0838* (2013.01); *G06F 16/2379* (2019.01); *G06Q 30/018* (2013.01);
(Continued)

(58) Field of Classification Search
USPC .......................................................... 705/50
See application file for complete search history.

(56) References Cited

U.S. PATENT DOCUMENTS 10,878,429 B2 * 12/2020 Bakalis ................. H04L 9/3213
2017/0046694 A1    2/2017 Chow et al.
(Continued)

FOREIGN PATENT DOCUMENTS

WO    WO-2018163044 A1 *  9/2018 ......... G06F 16/2315
WO    WO-2019081919 A1 *  5/2019 ........... H04L 9/3242

OTHER PUBLICATIONS

Wood ("Polkadot: Vision for a Heterogeneous Multi-Chain Framework", 2017, https://polkadot.network/PolkaDotPaper.pdf, accessed on Sep. 27, 2021) (Year: 2017).*

(Continued)

*Primary Examiner* — Neha Patel
*Assistant Examiner* — Clay C Lee
(74) *Attorney, Agent, or Firm* — Peter J. Edwards

(57) ABSTRACT

Techniques are described for linked blockchains that allow computing devices to access information from an acceptance blockchain about acceptance reports stored in an enterprise delivery blockchain that are also linked to a product blockchain that stores information of the products of the acceptance reports. An acceptance report is indicative of operability of a product in a service provided by a service provider. A processor is configured to access the block in the enterprise delivery blockchain, retrieve the acceptance report from the block in the enterprise delivery blockchain, determine an identifier, identified in the block in the enterprise delivery blockchain, to a block in an acceptance blockchain, access the block in the acceptance blockchain via the determined identifier, retrieve from the block in the acceptance blockchain contextual information of the acceptance report, and output the acceptance report and contextual information of the acceptance report.

23 Claims, 6 Drawing Sheets

(51) Int. Cl.
  G06Q 10/083 (2023.01)
  G06Q 30/018 (2023.01)
  H04L 9/06 (2006.01)
  H04L 9/00 (2022.01)

(52) U.S. Cl.
  CPC .......... H04L 9/0637 (2013.01); H04L 9/0643 (2013.01); G06Q 2220/00 (2013.01); H04L 9/50 (2022.05)

(56) References Cited

U.S. PATENT DOCUMENTS

| | | |
|---|---|---|
| 2017/0046799 A1 | 2/2017 | Chan et al. |
| 2017/0132393 A1 | 5/2017 | Natarajan et al. |
| 2018/0096175 A1* | 4/2018 | Schmeling ............ G06F 1/3206 |
| 2018/0108010 A1 | 4/2018 | McHale et al. |
| 2018/0114169 A1 | 4/2018 | Wiig et al. |
| 2018/0234433 A1* | 8/2018 | Oberhauser ........... H04L 9/3247 |
| 2019/0325498 A1* | 10/2019 | Clark ................. G06Q 30/0625 |
| 2019/0339668 A1* | 11/2019 | Biernat ................... H04L 63/12 |
| 2020/0118117 A1* | 4/2020 | McManus .............. G06Q 10/10 |
| 2020/0210413 A1* | 7/2020 | Quick ................. G06F 16/9024 |
| 2020/0274694 A1* | 8/2020 | Wood ................. G06F 16/2308 |
| 2020/0410508 A1* | 12/2020 | Schiffman ........... G06Q 10/103 |

OTHER PUBLICATIONS

Chaudhuri, Atanu, et. al., "Decision-making in cold chain logistics using data analytics: a literature review", International Journal of Logistics Management 29.3: 839-861. (Year: 2018).*
I-SCOOP, "Blockchain, digital trust and distributed ledger technology—going big business", 2017, 20 pgs., Applicant points out, in accordance with MPEP 609.04(a), that the year of publication, 2017, is sufficiently earlier than the effective U.S. filing date, 2018, so that the particular month of publication is not in issue.
Furlong, "The Blockchain Effect: How Will the Distributed Ledger Change the Customer Experience?", 2018, 9 pgs., [retrieved Jul. 31, 2018].

* cited by examiner

LINKED BLOCKCHAIN STRUCTURES FOR ACCELERATED MULTI-CHAIN VERIFICATION

BACKGROUND

Blockchains are distributed, immutable ledgers used to record transactions between parties in a permanent manner. The blockchains are implemented and managed by a peer-to-peer network. Once validated, a block is added to a blockchain, and the data of the block cannot be changed retroactively without alteration of all subsequent blocks in the blockchain, making it difficult to change data of a block or remove a block in a blockchain.

SUMMARY

In one example, the disclosure describes a computing device comprising memory configured to store blocks of an enterprise delivery blockchain, wherein a block of the enterprise delivery blockchain includes an acceptance report indicating operability of a product in a service provided by a service provider, and a processor configured to access the block in the enterprise delivery blockchain, retrieve the acceptance report from the block in the enterprise delivery blockchain, determine an identifier, identified in the block in the enterprise delivery blockchain, to a block in an acceptance blockchain, access the block in the acceptance blockchain via the determined identifier, retrieve from the block in the acceptance blockchain contextual information of the acceptance report, and output the acceptance report and contextual information of the acceptance report.

In one example, the disclosure describes a method comprising storing, in memory, blocks of an enterprise delivery blockchain, wherein a block of the enterprise delivery blockchain includes an acceptance report indicating operability of a product in a service provided by a service provider, accessing, with a processor, the block in the enterprise delivery blockchain, retrieving, with the processor, the acceptance report from the block in the enterprise delivery blockchain, determining an identifier, identified in the block in the enterprise delivery blockchain, to a block in an acceptance blockchain, accessing the block in the acceptance blockchain via the determined identifier, retrieving from the block in the acceptance blockchain contextual information of the acceptance report, and outputting the acceptance report and contextual information of the acceptance report.

In one example, the disclosure describes a computer program product comprising a computer readable storage medium having program code embodied therewith, the program code executable by at least one processor to access a block of blocks in an enterprise delivery blockchain stored in memory, wherein the block of the enterprise delivery blockchain includes an acceptance report indicating operability of a product in a service provided by a service provider, retrieve the acceptance report from the block in the enterprise delivery blockchain, determine an identifier, identified in the block in the enterprise delivery blockchain, to a block in an acceptance blockchain, access the block in the acceptance blockchain via the determined identifier, retrieve from the block in the acceptance blockchain contextual information of the acceptance report, and output the acceptance report and contextual information of the acceptance report.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

Like symbols in the drawings indicate like elements.

DETAILED DESCRIPTION

In general, the disclosure is directed to improved blockchain structures for accelerated data access and retrieval for multi-blockchain systems. As described in more detail, one example application for the techniques described herein is blockchain-based computerized data management of information transmitted from service provider to client, such as improved management of acceptance reports for information technology (IT) service providers. In general, IT service providers package different software and hardware products for their computing service that is sold to a client. The client may require the service provider to provide an acceptance report to show that the agreed upon software and hardware products are used and that the software and hardware products are configured in an agreed manner from each of the multiple service providers with whom the client contracts. This requires the client to manage multiple acceptance reports that can be substantially different from each other in terms of information that is provided and the amount of information that is provided.

In general, the disclosure describes a plurality of linked blockchains structured together to include private and public information that allows a computing device to quickly retrieve acceptance reports including contextual information of the acceptance report. As one example, the contextual information may be information indicating whether the acceptance report was acceptable, as well as, any other information about the quality of the acceptance report. An acceptance report includes information indicating adherence to the contractual agreement between the service provider and the client including operability of products in a service provide by the service provider.

The example techniques may provide technical advantages so as to be directed to practical applications. For example, in the linked blockchain structure, each blockchain is configured to store different types of information, and the linked architecture described herein allows a computing device to more quickly navigate through the blockchains to access information including contextual information about the acceptance. Furthermore, the linked blockchain structure allows client provided information to be linked back to acceptance reports as new entries in the blockchains so that other computing devices can also access contextual information about the acceptance reports.

Figure 1:
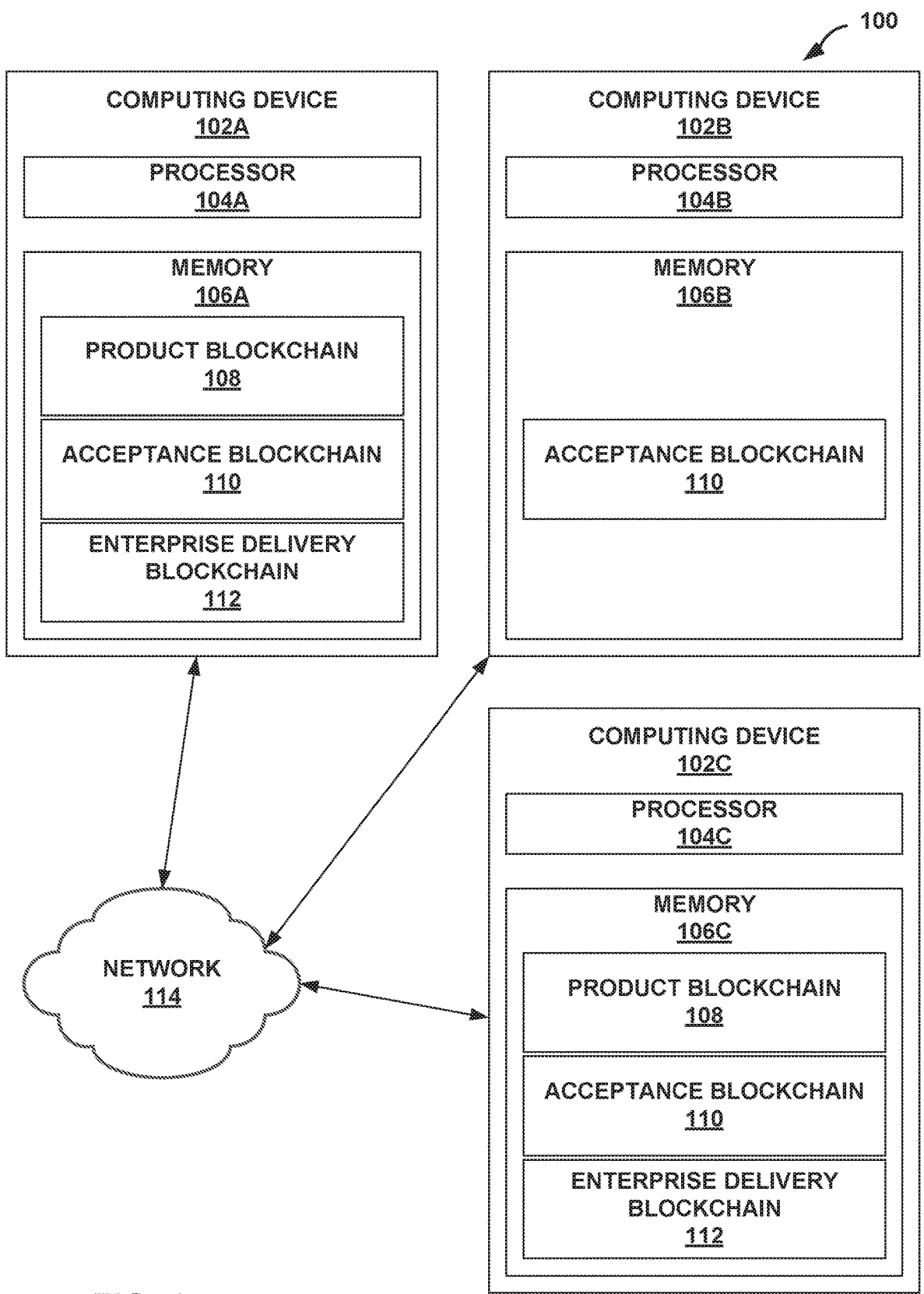
FIG. 1 is a block diagram illustrating an example system for maintaining a plurality of blockchains in accordance with one or more examples described in this disclosure.

FIG. 1 is a block diagram illustrating an example system 100 for maintaining a plurality of blockchains in accordance with one or more examples described in this disclosure. For example, system 100 provides a computerized cloud-based infrastructure. As illustrated, system 100 includes computing device 102A, 102B, and 102C (collectively computing devices 102) and network 114. In the cloud-based infrastructure, system 100 supports computing devices 102 on which applications or operations requested by one or more users run. For example, the cloud-based infrastructure of system 100 provides cloud computing for using computing devices 102, hosted on network 114, to store, manage, and process data, rather than needing to store, manage, and process data on a personal computing device with which a user interacts.

One or more of computing devices 102 may also be personal computing devices that provides a user with computing resources to the computing device of the user and the other computing devices 102 in the cloud-based infrastructure. In some examples, there may be a separate personal computing device (not shown) that does not necessarily store the example blockchains, described in more detail below, but is connected with network 114. The user may access the computing resources of computing devices 102 via the personal computing device and network 114.

Network 114 may transport data between network computing devices 102. For example, network 114 may form part of a packet-based network, such as a local area network, a wide-area network, or a global network such as the Internet. Network 114 may include routers, switches, base stations, or any other equipment that may be useful to facilitate data between computing devices 102 or between computing devices 102 and the personal computing device of the user in examples where one of computing devices 102 is not a personal computing device of the user.

Examples of computing devices 102 include server devices that provide computing functionality user requests. For example, computing devices 102 may share data or resources for performing user requested computations. As one example, computing devices 102 may be computing servers, but the example techniques are not so limited. Computing devices 102 may be a combination of computing servers, web servers, database servers, and the like.

Computing device 102A includes processor 104A and memory 106A, computing device 102B includes processor 104B and memory 106B, and computing device 102C includes processor 104C and memory 106C. As illustrated, memory 106A stores product blockchain 108, acceptance blockchain 110, and enterprise delivery blockchain 112. Memory 106B stores acceptance blockchain 110. Memory 106C stores product blockchain 108, acceptance blockchain 110, and enterprise delivery blockchain 112. As described in more detail below, product block chain 108, acceptance blockchain 110, and enterprise delivery blockchain 112 are computationally linked blockchains that allow quick retrieval of relevant to service providers and clients, such as enterprise clients.

One example of information relevant to service provides and clients is a so-called acceptance report. As explained above, an acceptance report includes information indicating adherence to the contractual agreement between the service provider and the client including operability of products in a service provide by the service provider.

In most of the client services projects, such as in information technology (IT) service delivery projections (e.g., IT modernization, system integration, data center migration, etc.), an enterprise client may need a detailed acceptance report and have knowledge of the acceptance report to accept delivery of products and services (e.g., for milestone payment). However, due to lack of certain standards, and knowledge to verify the report, the review and negotiation of product/service delivery may take a couple of months or longer.

For example, due to the client not having sufficient professional knowledge or reliable references for determining whether the acceptance report is quality or not, the client may prefer delaying acceptance of the acceptance report. There may not be trustable and consistent acceptance standards for sectors or specific integration with can be trusted or shown to the client as examples of acceptance reports that are trusted or accepted as a standard. This can result in difficulty between service providers and clients reaching agreement on acceptance of the delivery of the product and services.

In such cases, clients or service providers may maintain databases that includes information about acceptance reports, along with some meta-data about the content of the acceptance reports that the client or service provider may access for information about acceptance reports. However, there may be computational inefficiencies in maintaining such databases. For example, the client, the service provider, and standards organization (as one example) may each maintain and manage separate, distinct databases that are not accessible or referable by all three of the client, the service provider, or the standards organization. Furthermore, there may not be any computational linking between these separate, distinct databases that logically connects the information in the different databases. Accordingly, even if access were available to the different databases, there may be computational inefficiencies in searching sequentially through each of the databases to find database entries relevant to the client, the service provider, or the standards organization.

This disclosure describes example techniques for improved blockchain structures for accelerated data access and retrieval for multi-blockchain systems. For example, the disclosure describes a plurality of linked blockchains structured together to include private and public information that allows a computing device to quickly retrieve acceptance reports including contextual information of the acceptance report.

A blockchain is a decentralized, distributed digital ledger that is used to record transactions across many computing devices. A record of the transaction is stored in a block of the blockchain and added to the end of the blockchain. Each block includes a cryptographic hash of the previous block, a timestamp, the transaction information, and in some examples a cryptographic hash of itself.

Because the blockchain is distributed so that each of the computing device that stores the blockchain stores the same blockchain, the record cannot be altered retroactively without the alteration of all subsequent blocks and consensus between the computing devices that form the network of computing device for the blockchain. The blockchain database (e.g., the information in the blocks of the blockchain) is managed autonomously using a peer-to-peer network and distributed timestamping server.

For linked blockchains, a block in a first blockchain includes as its information the hash of a block in a second blockchain. In this way, the block in the first blockchain is linked with the block in the second blockchain. A block in a particular blockchain may be linked with one or more blocks across multiple blockchains or may not be linked with another block in a different blockchain.

The blockchains may be public blockchains, private blockchains, or hybrid blockchains. In a public blockchain, the blockchain is accessible by a large number of entities, including almost anyone, for both reading information from blocks in the public blockchains and for adding on new blocks to the public blockchains. In a private blockchain, the blockchain is accessible by a relatively small number of entities for reading information from blocks in the private blockchain or adding new blocks to the private blockchains. In a hybrid blockchain, there may be a relatively large number of entities that can read from the hybrid blockchain or there may be a subset of information that can be read from the hybrid blockchain by the relatively large number of entities. However, a relatively small number of entities may have full read access or may be able to add new blocks to the hybrid blockchains.

As illustrated in FIG. 1, memory 106A stores product blockchain 108, acceptance blockchain 110, and enterprise delivery blockchain 112. Memory 106B stores acceptance blockchain 110. Memory 106C stores product blockchain 108, acceptance blockchain 110, and enterprise delivery blockchain 112. Product blockchain 108 stored in memory 106A and stored in memory 106C may be the exact same product blockchain having the same records. Similarly, acceptance blockchain stored in memory 106A, 106B, and 106C may be the exact same acceptance blockchain having the same records. Enterprise delivery blockchain 112 stored in memory 106A and memory 106C may be the exact same enterprise delivery blockchain having the same records. Computing devices 102 may update their respective blockchains using the peer-to-peer network through network 114. One of computing devices 102 may be the distributed timestamp server, or another computing device connected to network 114 may be the distributed timestamp server.

The distribution of the example blockchains 108, 110, and 112 is provided to ease with understanding and should not be considered as limiting. For example, memory 106C may not include one of blockchains 108, 110, or 112, and memory 106B may include one or both of blockchains 108 and 112. Other permutations and combinations are possible.

Respective ones of processors 104 are configured to execute applications that implement the operations of the peer-to-peer network to add blocks or allow access to read blocks from respective ones of blockchains 108, 110, and 112. Processors 104 may be formed as at least one of fixed-function or programmable circuitry. Examples of processors 104 include microprocessors, application specific integrated circuits (ASICs), field programmable gate arrays (FPGAs), digital signal processors (DSPs), or other equivalent integrated or discrete logic circuitry.

Processors 104 may each execute an application programming interface (API) with which processors 104 are able to access respective blockchains 108, 110, and 112. When a block is to be added to one or more of blockchains 108, 110, and 112, respective ones of processors 104, via execution of the API, may be configured to generate the cryptographic hash of the block, store information of the transaction in the block, and store the cryptographic hash of the previous block. When a user needs to read information from the block, respective ones of processors 104 execute the API to generate a call for the requested information from the block and output the information to the computing device of the user. In this manner, processors 104 provide access to the blocks in the respective blockchains 108, 110, and 112 to retrieve information from the block and to update respective blockchains 108, 110, and 112 with new blocks.

In one or more examples, service providers, including product vendors, standard organizations or other third parties (simply referred to as third parties), and clients may manage and maintain respective one or more of product blockchain 108, acceptance blockchain 110, and enterprise delivery blockchain 112.

For example, when a product vendor releases product information, the product vendor may access product blockchain 108 and cause processors 104 to add a new block to product blockchain 108 with the product information. The product vendor may instruct processors 104 with the product information for insertion in product blockchain 108 via a personal computing device of the product vendor, which may be one of computing devices 102 or a separate device connected to network 114. When the product vendor fulfills an order (e.g., there is a purchase), the product vendor, via its personal computing device, may cause processors 104 to add a new block in the product blockchain 108 with the transaction (e.g., purchase) data. The data of purchase information will have a hash (or unique ID) pointed to the product block in the blockchain. Accordingly, product blockchain 108 may maintain two types of data. The first type of data is product information (e.g., first category=product), and the second type of data is product transaction information (e.g., second category=product transaction).

In some examples, the product information may be publicly accessible. However, the product transaction information may only be accessible by a subset of entities, such as those who purchased the products from the product vendor (e.g., a service provider that bundles the products from product vendors to generate a full service for delivery to the client, and/or the client may have access about the product transaction information). Entities (e.g., service provider or client) that want to access the product transaction information may be granted a valid access key or token.

In one or more examples, various third parties can post standards or checklist to acceptance blockchain 110. Examples of the entities that can add new blocks to the acceptance blockchain 110 include product vendor, service provider, standards organization, etc.

After new products are released and posted to product blockchain 108, these third parties will query, via the API executing on processors 104, to get the hash (or unique ID) of the newly added block that stores the information for the new products. The third parties may compose and submit the standards/checklist for specific product as a new block to the acceptance blockchain 110. The checklist block (e.g., block that includes standards checklist for the new product) may point (e.g., refer) to the block in product blockchain 108 that stores information of the product with the hash (or unique ID) queried from product blockchain 108.

The checklist or standards document are examples of contextual information for the acceptance report. Contextual information for the acceptance report includes information indicating the manner in which the acceptance report was generated, such as information about which checklist was used or which standards documents were used to generate the acceptance report. As described in more detail below, contextual information also includes statistics and user comments and the like about the acceptance report.

One example of the checklist or standards document may be information about what types of information and how much detail should be in the acceptance report for the product, whose information is stored in the block in product chain 108. For example, assume that a block in product blockchain 108 included information about the product, as illustrated in more detail in FIG. 2. A third party access the information of the block in product blockchain 108 and determines what types of information would be useful for an acceptance report that identified the product, and the amount of detail that would be useful in the acceptance report that identified the product. The third party may generate a checklist or some other type of document that describes information that would be useful for an acceptance report and describes amount of detail that would be useful in the acceptance report.

The third party may then cause processors 104 to add a block to acceptance blockchain 110 that includes the checklist or the document. Also, the block in acceptance blockchain 110 may include the hash or unique ID of the block in product blockchain 108 that includes the product information for which the third party generated the checklist or document indicating types of information and details of information that should be in an acceptance report that identifies the product whose product information is stored in the block in blockchain 108. In this way, the block in acceptance blockchain 110 is linked with the block in blockchain 108.

In some examples, in addition to the checklist or the document, blocks in acceptance blockchain 110 also store information about the statistics or comments about the checklist or the document. As one example, blocks in acceptance blockchain 110 store information indicating how often the acceptance report conforming to the checklist or standards document was referred to, accepted/rejected by the client. For example, blocks in acceptance blockchain 110 may store a first counter that indicates how many times the acceptance report was referred to and a second counter indicates how many times the acceptance report was accepted and rejected.

As another example, blocks in acceptance blockchain 110 store information indicating what other information should be in the checklist or standards document for the acceptance report. In general, blocks in acceptance blockchain 110 may store feedback and evaluation of the acceptance report from clients or other parties. The feedback and evaluation information of the acceptance report are additional examples of the contextual information of the acceptance report. Accordingly, acceptance blockchain 110 may be a public blockchain that anyone in the public may be able to access.

The blocks of acceptance blockchain 110 may store two types of data. A first type of data is the standards document or checklist by third parties (e.g., standards creator or promoter). A second type of data is statistics of the standards document or checklist. The statistics of the standard documents or checklists is also examples of contextual information of the acceptance report. This is the data block inserted once a client gives feedback and/or evaluation to the acceptance report from service provider. Once a client confirms acceptances reports (accept or reject), the statistics of that checklist (which report generated against to) will be changed based on customer feedback.

When a service provider purchases various products for customers, these transaction (purchase) information will be generated and added to product blockchain 108. The service provider also gets the key (token) to access product transaction information from product blockchain 108.

Once a service provider completes initial product install, configuration and verification, the service provider may generate the acceptance reports and post those reports to enterprise delivery blockchain 112. Each of report data may have two hashes. For example, a first hash points to (e.g., identifies) the block in acceptance blockchain 110 that includes information about the acceptance report (e.g., standards document or checklist and the statistics). A second hash points to (e.g., identifies) the product transaction block in product blockchain 108 that includes the information of the product in the service provided by the service provider. After reports are posted, the service provider may provide access key (or token) to the client to access the acceptance report in enterprise delivery blockchain 112 via APIs exposed by enterprise delivery blockchain 112.

Accordingly, enterprise delivery blockchain 112 may be a private blockchain. In some examples, any entity that has access to enterprise delivery blockchain 112 also has access to acceptance blockchain 110. However, not all entities that have access to the acceptance blockchain 110 have access to the enterprise delivery blockchain 112. For example, enterprise delivery blockchain 112 and acceptance blockchain 110 are different blockchains. Enterprise delivery blockchain 112 is a private blockchain accessible by a first set of entities, and acceptance blockchain 110 is a public blockchain accessible by a second set of entities. The second set of entities includes all of the first set of entities and one or more entities not in the first set of entities.

When client receives the acceptance reports from the service provider, the client also retrieves the links (e.g., hash or unique ID) to product blockchain 108 and acceptance blockchain 110 in report data. As one example, assume that computing device 102A is the computing device that the client uses to access the acceptance report. It should be understood that in some examples, the client may interact with a different computing device connected to network 114 that allows access to computing devices 102 via network 114. However, for ease of description the example is described with respect to computing device 102A being the computing device of the client.

Processor 104A may be configured to access a block in enterprise delivery blockchain 112, stored in memory 106A, that stores the acceptance report for a particular product. Processor 104A may retrieve the acceptance report from the block in enterprise delivery blockchain 112.

Processor 104A may determine an identifier, identified in the block in enterprise delivery blockchain 112, to a block in acceptance blockchain 110. One example of the identifier is the first hash that points to (e.g., identifies) the block in acceptance blockchain 110 that includes information about the acceptance report (e.g., standards document or checklist and the statistics).

Processor 104A may access the block in acceptance blockchain 110 via the determined identifier (e.g., first hash). For example, processor 104A may use the first hash to determine the block in acceptance blockchain 110. Processor 104A may query the "reference summary" of the standards document or checklist used in the actual project delivery such as: Number of reference of that checklist in recent 6 months, Number of acceptances of that checklist in recent 6 months, Comments why the acceptance report was accepted or rejected. The "reference summary" is one example of contextual information of the acceptance report (e.g., such as statics of the acceptance report). For instance, examples of contextual information of the acceptance report include information indicative of one or more of product acceptance criteria (e.g., information of what is on the checklist or standards document), how many times the product acceptance criteria has been used (e.g., information of how often the checklist or standards document was used), or how many times the product acceptance criteria has been approved (e.g., information of how many times the criteria of the checklist or standards document was determined to be sufficient to show that the acceptance report is of sufficient quality).

The client may make an informed decision based on these statistics. For example, processor 104A may output the acceptance report and contextual information of the acceptance report. The client may then determine whether to accept or reject the acceptance report. Information of whether the client accepted or rejected the acceptance report would then be added as a new block to acceptance blockchain 110.

For example, processor 104A may receive information indicating updates to the contextual information of the acceptance report. As few examples, processor 104A receives information indicating whether the client accepted or rejected the acceptance report, processor 104A receives information indicating whether the client provided any comments about the acceptance report, processor 104A receives information indicating the time when the client provided the comments and when the client rejected or accepted the acceptance report, and the like. Processor 104A may output information indicating the updates to the contextual information (e.g., as provided by the client) for causing another block to be added to acceptance blockchain 110 that includes the updated contextual information.

By receiving client feedback and evaluation on the acceptance reports, the example techniques may further promote convergence to a standard for what should and should not be included in acceptance reports. For example, based on client feedback it may be possible to determine what type of additional information should be in the acceptance report. Also, by keeping a counter of how many times acceptance reports are accepted and how many time acceptance reports are rejected, the counts may be a form of voting from clients indicating which are good acceptance reports and which are poor acceptance reports. This can promote acceptance standards for convergence and adoption of a standard for preparing acceptance reports.

Moreover, a client, who may not be particularly knowledgeable of acceptance reports, may still be able to query acceptance blockchain 110 to determine whether the acceptance report the client has received is one that is generally accepted by clients or rejected by clients. If the client is presented with acceptance reports that are not generally accepted, then the client may request the service provider to provide a better, more accepted, acceptance report.

In addition, processor 104A may determine another identifier (e.g., second hash), identified in the block in enterprise delivery blockchain 112, to a block in product blockchain 108. One example of this other identifier is the second hash that points to (e.g., identifies) the product transaction block in product blockchain 108 that includes the information of the product in the service provided by the service provider.

Processor 104A may access the block in product blockchain 108 via the determined identifier (e.g., second hash). For example, processor 104A may use the second hash to determine the block in product blockchain 108. Processor 104A may query the product transaction data in the block of product blockchain 108 to ensure the products delivered/installed are from authentic product vendor.

For instance, processor 104A may determine a second identifier, identified in enterprise delivery blockchain 108, to a block in product blockchain 108. Processor 104A may access the block in product blockchain 108 via the determined second identifier and retrieve from the block in product blockchain 108 information indicative of the product in the service. Processor 104A may output information indicative of the products in the service.

As described above, after the client makes a decision whether to accept or reject the acceptance reports, the client can provide feedback to acceptance blockchain 110. After the feedback provided (e.g., after information indicating updates to the contextual information of the acceptance report is received), a new block of statistics (for referred Standards) will be generated and inserted to acceptance blockchain 110 as the statistics are changed (e.g., the outputted information indicating the updates to the contextual information for causing another block to be added to acceptance blockchain 110 that includes the updated contextual information).

In the above example, computing device 102A was described as performing the example techniques. However, in some examples, a computing device other than one of computing devices 102 may be configured to perform the example techniques. For instance, the client computing device is connected to network 114 but may not store any of blockchains 108, 110, and 112, or may not store enterprise delivery blockchain 112. In such examples, the client computing device includes a memory and a processor. The client computing device processor may access a block in enterprise delivery blockchain 112 through network 114 and retrieve information of the block for storage in the memory of the client computing device. The client computing device processor may then retrieve the acceptance report from the block stored in memory as the way to retrieve the acceptance report from the block in enterprise delivery blockchain 112.

Therefore, in this disclosure, a memory configured to store one or more blocks of enterprise delivery blockchain 112, where a block of enterprise delivery blockchain 112 includes an acceptance report indicating operability of products in a service provided by a service provider includes the example where one of memories 106 stores enterprise delivery blockchain 112 and includes the example where a processor of a computing device retrieves the one or more blocks of enterprise delivery blockchain 112 for storage in the memory of the computing device. Also, in this disclosure, a processor accessing the block in enterprise delivery blockchain 112 includes the example where processor 104A accesses the block in enterprise delivery blockchain 112 stored on memory 106A and the example where the processor of the computing device accesses the block in enterprise delivery blockchain 112 through network 114. Further, in this disclosure, a processor retrieving the acceptance report from the block in enterprise delivery blockchain 112 includes the example where processor 104A retrieves the acceptance report from the block in enterprise delivery blockchain 112 as stored in memory 106A and the example where the processor of the client device retrieves the acceptance report from the block in enterprise delivery blockchain 112 as stored in the memory of the computing device after retrieval by the processor.

Similarly, in this disclosure, a processor accessing and retrieving blocks from acceptance blockchain 110 includes the example where processor 104A accesses and retrieves blocks from acceptance blockchain 110 as stored in memory 106A and includes the example where the processor of the computing device accesses and retrieves from acceptance blockchain 110 via network 114. Therefore, a processor configured to perform the example techniques described in this disclosure includes examples where the processor is on a computing device that stores one or more of the blockchains 108, 110, and 112, and includes examples where the processor is on a computing device that does not store one or more the blockchains 108, 110, and 112.

For instance, in one example, to access the block in enterprise delivery blockchain 112, the processor is configured to output a request via network 114 to one or more computing devices 102, and responsive to the request, receive access to the block in enterprise delivery blockchain 112. In another example, to access the block in enterprise delivery blockchain 112, the processor (e.g., processor 104A) is configured to access memory 106A for enterprise delivery blockchain 112.

In one example, to access the block in acceptance blockchain 110, the processor is configured to output a request via network 114 to one or more computing devices 102, and responsive to the request, receive access to the block in acceptance blockchain 110. In another example, to access the block in enterprise delivery blockchain 112, the processor (e.g., processor 104A) is configured to access memory 106A for acceptance blockchain 110.

Figure 2:
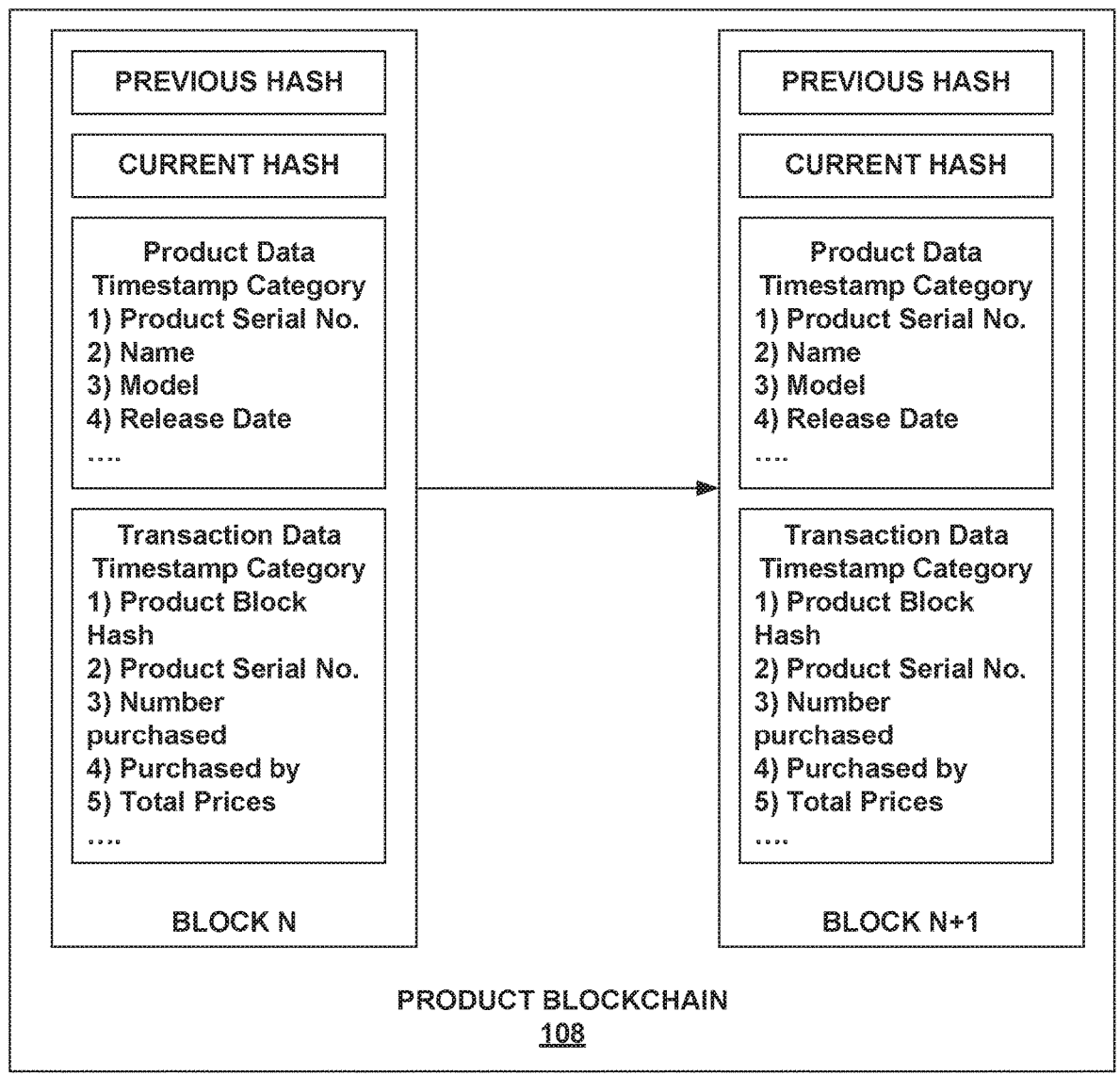
FIG. 2 is a conceptual diagram illustrating an example of information in a product blockchain of the plurality of blockchains.

FIG. 2 is a conceptual diagram illustrating an example of information in a product blockchain of the plurality of blockchains. As illustrated, product blockchain 108 includes block N and block N+1. Block N includes previous hash, which is an identifier to the N−1 block, the current has, which is an identifier for the N block, and includes two types of data: product data and transaction data. Block N+1 is similar to block N, where the previous hash is the hash for block N.

The product data includes timestamp, product serial number, name, model release date, as a few non-limiting examples. The transaction data includes a hash or unique identifier pointing to the product data block, product serial number, number of units purchased, date purchased by, and total prices as a few examples.

Figure 3:
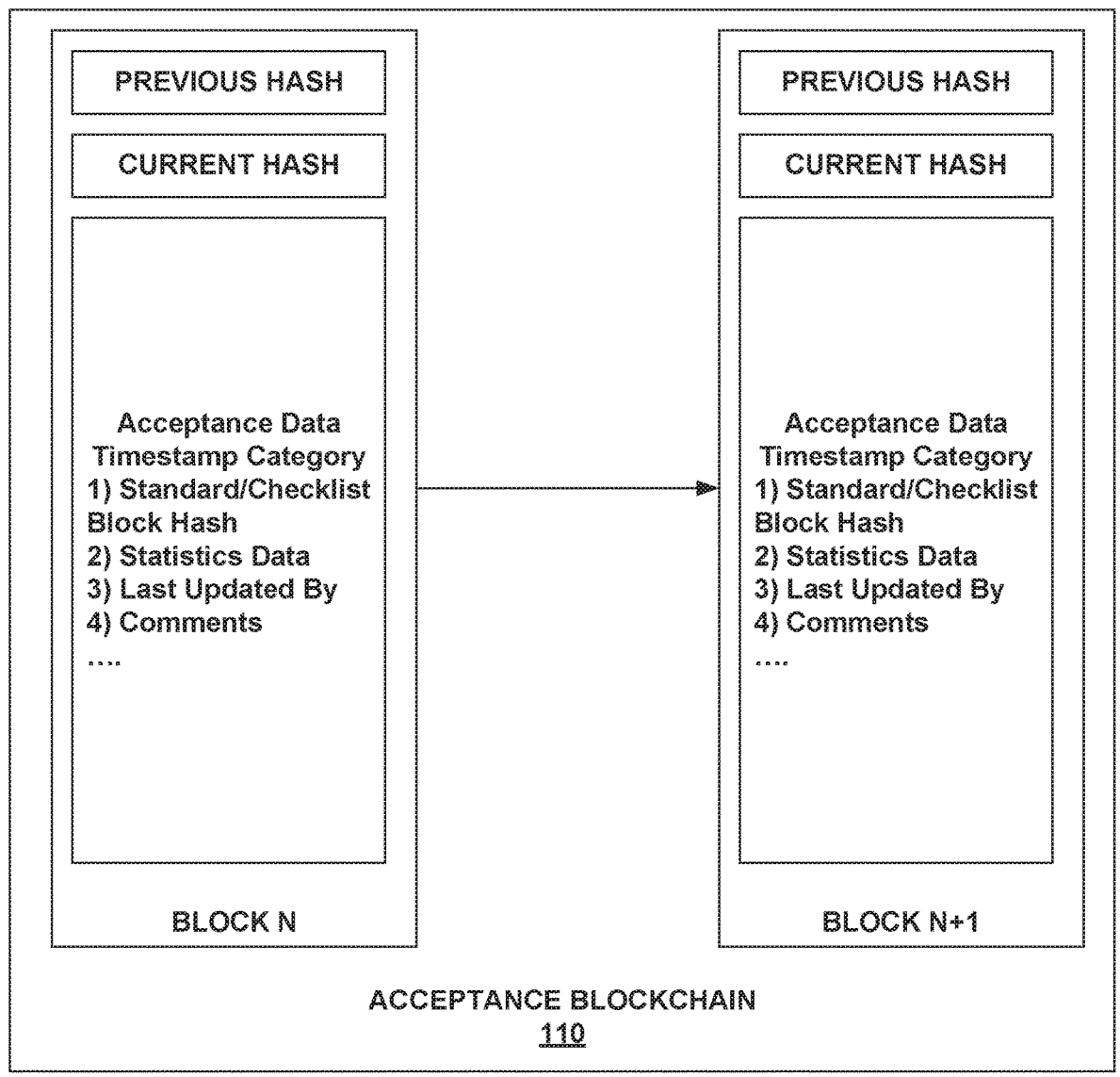
FIG. 3 is a conceptual diagram illustrating an example of information in an acceptance blockchain of the plurality of blockchains.

FIG. 3 is a conceptual diagram illustrating an example of information in an acceptance blockchain of the plurality of blockchains. As illustrated, acceptance blockchain 110 includes block N and block N+1. Block N includes previous hash, which is an identifier to the N−1 block, the current has, which is an identifier for the N block, and includes two types of data: product data and transaction data. Block N+1 is similar to block N, where the previous hash is the hash for block N.

The acceptance data includes timestamp, standard/checklist block hash, statistic data, last updated by, and comments. This acceptance data is examples of contextual information of the acceptance report. The standard/checklist block hash is an identifier to a block in product blockchain 108, where the block in product blockchain 108 includes product information and the block in acceptance blockchain 110 includes contextual information for the acceptance report for the product in the block in product blockchain 108 identified by the standard/checklist block hash.

Figure 4:
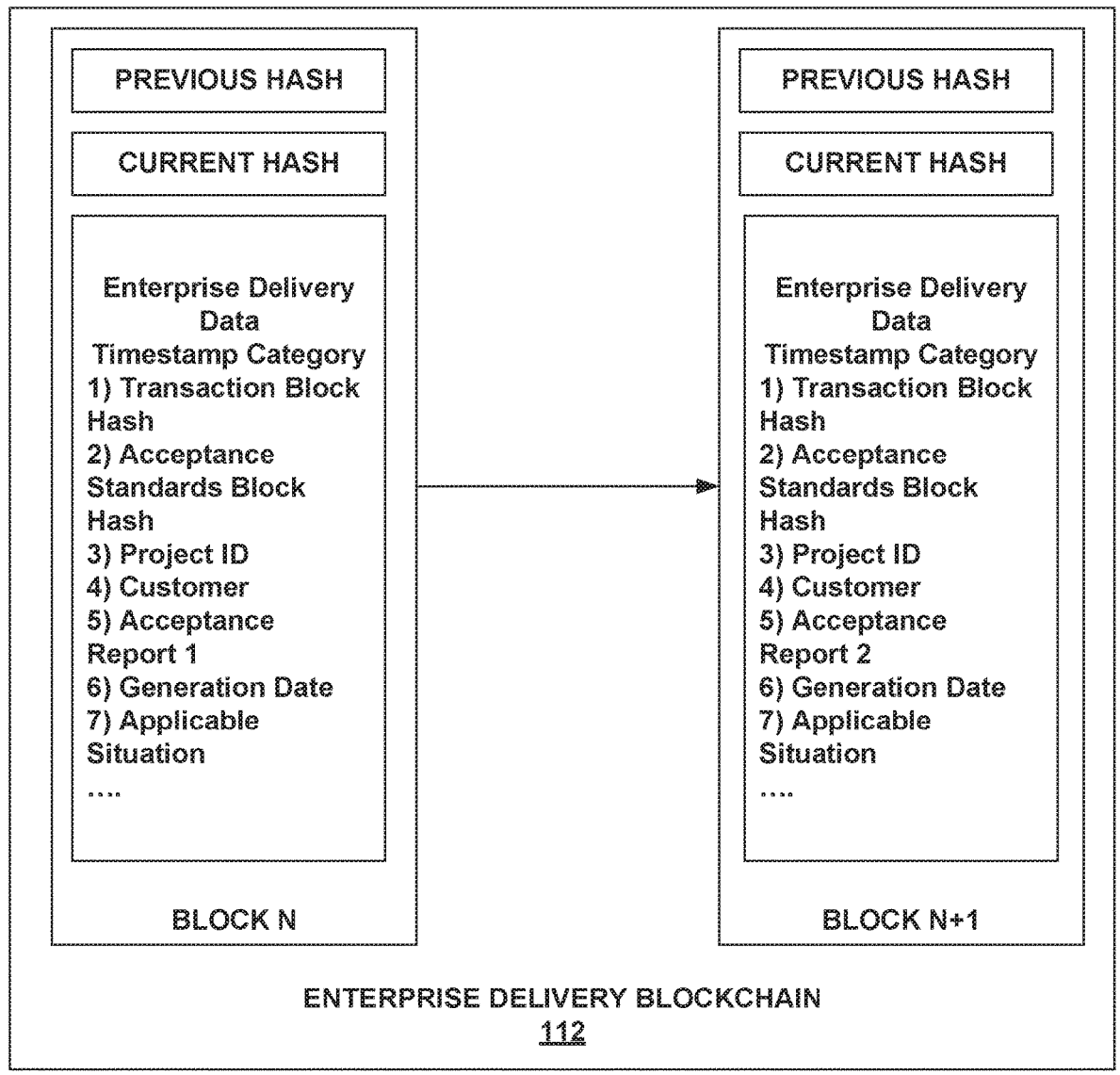
FIG. 4 is a conceptual diagram illustrating an example of information in an enterprise delivery blockchain of the plurality of blockchains.

FIG. 4 is a conceptual diagram illustrating an example of information in an enterprise delivery blockchain of the plurality of blockchains. As illustrated, enterprise delivery blockchain 112 includes block N and block N+1. Block N includes previous hash, which is an identifier to the N−1 block, the current has, which is an identifier for the N block, and includes two types of data: product data and transaction data. Block N+1 is similar to block N, where the previous hash is the hash for block N.

The enterprise delivery data includes timestamp, transaction block hash, acceptance standards block hash, project ID, customer, acceptance report 1, 2, generation date, application situation, and the like. The transaction block hash is an identifier to a block in product blockchain 108 and acceptance standards block hash is an identifier to a block in acceptance blockchain 110. The block in the product blockchain 108 provides information indicative of a product from the products in the service. The block in acceptance blockchain 110 includes the contextual information of the acceptance report of that product. The acceptance report indicates operability of the product in the service.

Figure 5:
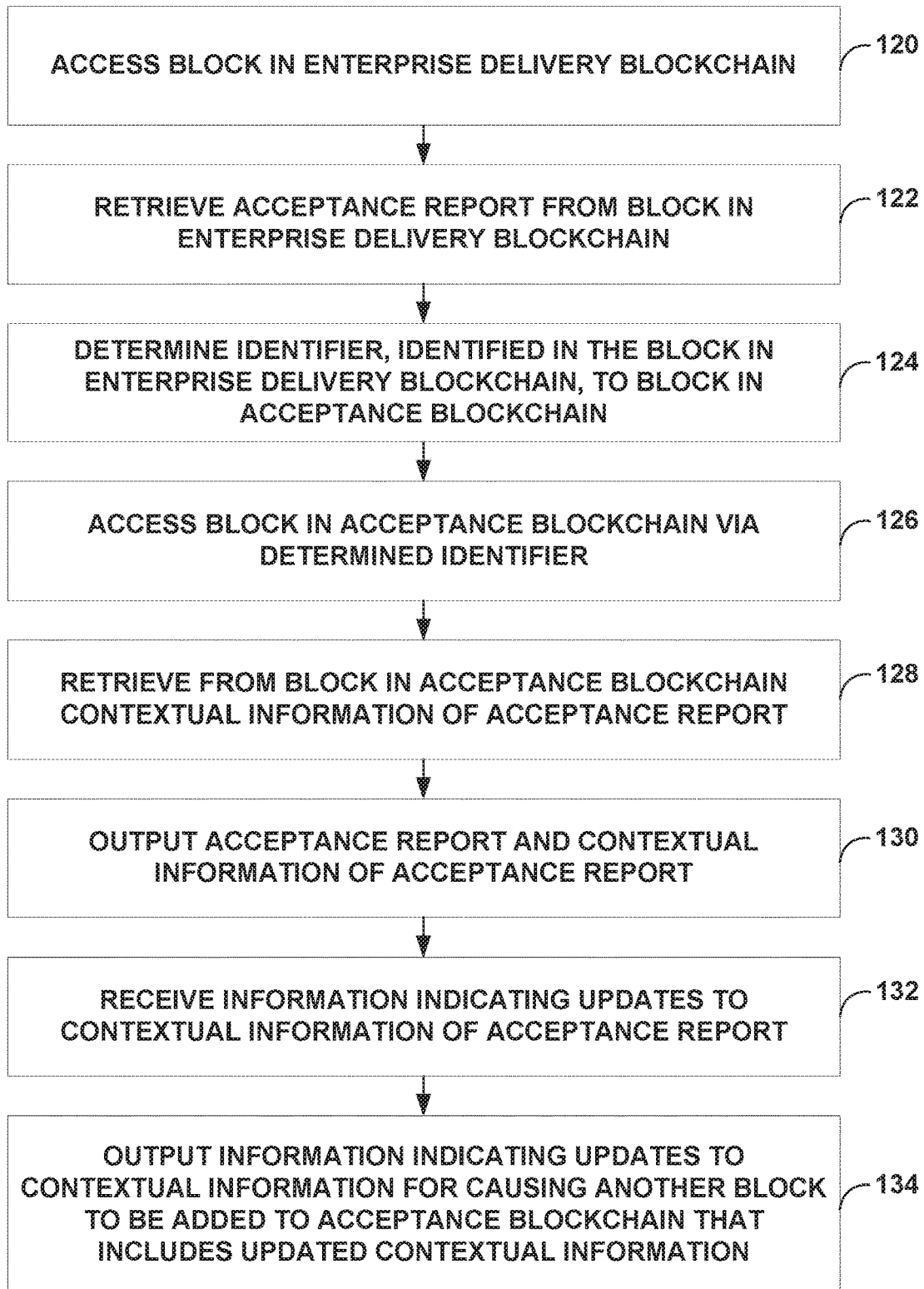
FIG. 5 is a flowchart illustrating a method of operation in accordance with one or more examples described in this disclosure.

FIG. 5 is a flowchart illustrating a method of operation in accordance with one or more examples described in this disclosure. As illustrated, a processor of a computing device accesses a block in enterprise delivery blockchain 112 (120). In one example where the computing device is computing device 102A, processor 104A access the block in enterprise delivery blockchain 112 stored in memory 106A. In one example where the computing device is a device other than computing devices 102, the processor of the computing device accesses the block in enterprise delivery blockchain 112 in one of memories 106 via network 114. In such an example, the processor may output a request via network 114 to one or more computing devices 102, and responsive to the request, the processor may receive access to the block in enterprise delivery blockchain 112. The processor may then store the block from enterprise delivery blockchain 112 in memory of the computing device.

The processor may retrieve an acceptance report from the block of enterprise delivery blockchain 112 (122). The processor may determine a first identifier (e.g., hash or unique ID), identified in the block in the enterprise delivery blockchain 112, to a block in acceptance blockchain 110 (124). Enterprise delivery blockchain 112 is separate from acceptance blockchain 110. Also, enterprise delivery blockchain 112 may be a private blockchain accessible by a first set of entities, and acceptance blockchain 110 may be a public blockchain accessible by a second set of entities. In some examples, the second set of entities includes all of the first set of entities and one or more entities not in the first set of entities.

The processor may access the block in acceptance blockchain 110 via the determined first identifier (126). For example, the processor may output a query to identify the block in acceptance blockchain 110 having the first identifier as its current hash. In one example, such as where the processor is of a computing device other than computing devices 102, to access the block in acceptance blockchain 110, the processor may be configured to output a request via a network to one or more computing devices 102, and responsive to the request, receive access to the block in acceptance blockchain 110. In one example, where the computing device is computing device 102A, processor 104A may access the block in acceptance blockchain 110 stored in memory 106A.

The processor may retrieve from the block in acceptance blockchain 110 contextual information of the acceptance report (128). Examples of the contextual information are provided above. As a few non-limiting examples, to retrieve from the block in acceptance blockchain 110 contextual information of the acceptance report, the processor may be configured to retrieve from the block in acceptance blockchain 110 information indicative of one or more of product acceptance criteria, how many times the product acceptance criteria has been used, or how many times the product acceptance criteria has been approved.

The computing device, via the processor, may output the acceptance report and contextual information of the acceptance report (132). For example, the client may view the acceptance report to determine whether the service provider has adhered to the contractual arrangement. The client may also view the contextual information that indicates in general the statistics, feedback, and evaluation information of the acceptance report from which the client can determine whether the acceptance report is of sufficient quality and detail to be accepted.

In some examples, the processor may receive information (e.g., from the client) indicating updates to the contextual information of the acceptance report (132). The updates to the contextual information may be information indicating whether the client accepted or rejected the acceptance report, whether the client provided any comments about the acceptance report, and the like. In response, the processor may output information indicating the updates to the contextual information for causing another block to be added to acceptance blockchain 110 that includes the updated contextual information.

In some examples, the processor may determine a second identifier, identified in the block in enterprise delivery blockchain 112, to a block in product blockchain 108. The processor may access the block in product blockchain 108 via the determined second identifier and retrieve from the block in the product blockchain information indicative of the product in the service. The processor may then output the information indicative of the product in the service.

Figure 6:
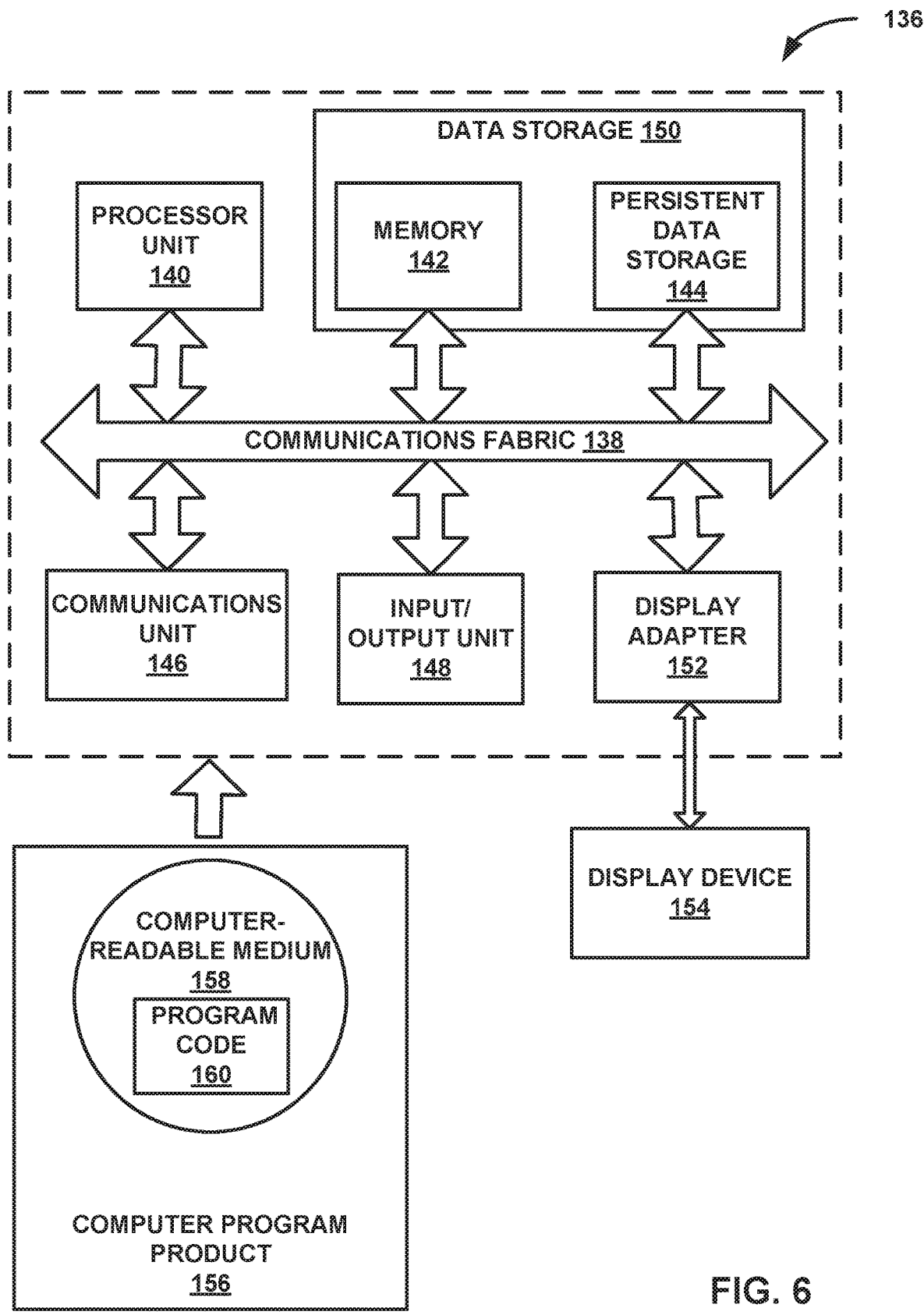
FIG. 6 is a block diagram illustrating an example computing device of FIG. 1 in further detail.

FIG. 6 is a block diagram of a computing device 136 that may be used to access example blockchains, in accordance with an example of this disclosure. Computing device 136 may be an example of computing devices 102 as depicted in FIG. 1 or may be an example of a computing device that does not store one or more blockchains 108, 110, and 112 (e.g., unlike computing devices 102). Computing device 136 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 136 may include a computer having capabilities or formats other than or beyond those described herein.

In the illustrative example of FIG. 6, computing device 136 includes communications fabric 138, which provides communications between processor unit 140, memory 142, persistent data storage 144, communications unit 146, and input/output (I/O) unit 148. Communications fabric 138 may include a dedicated system bus, a general system bus, multiple buses arranged in hierarchical form, any other type of bus, bus network, switch fabric, or other interconnection technology. Communications fabric 138 supports transfer of data, commands, and other information between various subsystems of computing device 136.

Processor unit 140 is an example of processors 104 or a processor on a computing device connected to network 114 other than computing devices 102. Processor unit 140 may be a programmable central processing unit (CPU) configured for executing programmed instructions stored in memory 142. In another illustrative example, processor unit 140 may be implemented using one or more heterogeneous processor systems in which a main processor is present with secondary processors on a single chip. In yet another illustrative example, processor unit 140 may be a symmetric multi-processor system containing multiple processors of the same type. Processor unit 140 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 140 may include a multi-core processor, such as a dual core or quad core processor, for example. Processor unit 140 may include multiple processing chips on one die, and/or multiple dies on one package or substrate, for example. Processor unit 140 may also include one or more levels of integrated cache memory, for example. In various examples, processor unit 140 may comprise one or more CPUs distributed across one or more locations.

Data storage 150 includes memory 142 and persistent data storage 144, which are in communication with processor unit 140 through communications fabric 138. Memory 142 can include a random access semiconductor memory (RAM) for storing application data, i.e., computer program data, for processing. While memory 142 is depicted conceptually as a single monolithic entity, in various examples, memory 142 may be arranged in a hierarchy of caches and in other memory devices, in a single physical location, or distributed across a plurality of physical systems in various forms. While memory 142 is depicted physically separated from processor unit 140 and other elements of computing device 136, memory 142 may refer equivalently to any intermediate or cache memory at any location throughout computing device 136, including cache memory proximate to or integrated with processor unit 140 or individual cores of processor unit 140.

Persistent data storage 144 may include one or more hard disc drives, solid state drives, flash drives, rewritable optical disc drives, magnetic tape drives, or any combination of these or other data storage media. Persistent data storage 144 may store computer-executable instructions or computer-readable program code for an operating system, application files comprising program code, data structures or data files, and any other type of data. These computer-executable instructions may be loaded from persistent data storage 144 into memory 142 to be read and executed by processor unit 140 or other processors. Data storage 150 may also include any other hardware elements capable of storing information, such as, for example and without limitation, data, program code in functional form, and/or other suitable information, either on a temporary basis and/or a permanent basis.

Persistent data storage 144 and memory 142 are examples of physical, tangible, non-transitory computer-readable data storage devices. Data storage 150 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 140 can also be suitably programmed to read, load, and execute computer-executable instructions or computer-readable program code. This program code may be stored on memory 142, persistent data storage 144, or elsewhere in computing device 136. This program code may also take the form of program code 160 stored on computer-readable medium 158 (e.g., a computer-readable storage medium) comprised in computer program product 156, and may be transferred or communicated, through any of a variety of local or remote means, from computer program product 156 to computing device 136 to be enabled to be executed by processor unit 140.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 140 can be suitably programmed to read, load, and execute instructions of the operating system.

Communications unit 146, in this example, provides for communications with other computing or communications systems or devices. Communications unit 146 may provide communications through the use of physical and/or wireless communications links. Communications unit 146 may include a network interface card for interfacing with network 114, an Ethernet adapter, a Token Ring adapter, a modem for connecting to a transmission system such as a telephone line, or any other type of communication interface. Communications unit 146 can be used for operationally connecting many types of peripheral computing devices to computing device 136, such as printers, bus adapters, and other computers. Communications unit 146 may be implemented as an expansion card or be built into a motherboard, for example.

The input/output unit 148 can support devices suited for input and output of data with other devices that may be connected to computing device 136, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 148 may also include any type of interface for video output in any type of video output protocol and any type of monitor or other video display technology, in various examples. It will be understood that some of these examples may overlap with each other, or with example components of communications unit 146 or data storage 150. Input/output unit 148 may also include appropriate device drivers for any type of external device, or such device drivers may reside elsewhere on computing device 136 as appropriate.

Computing device 136 also includes a display adapter 152 in this illustrative example, which provides one or more connections for one or more display devices, such as display device 154, which may include any of a variety of types of display devices. It will be understood that some of these examples may overlap with example components of communications unit 146 or input/output unit 148. Input/output unit 148 may also include appropriate device drivers for any type of external device, or such device drivers may reside elsewhere on computing device 136 as appropriate. Display adapter 152 may include one or more video cards, one or more graphics processing units (GPUs), one or more video-capable connection ports, or any other type of data connector capable of communicating video data, in various examples. Display device 154 may be any kind of video display device, such as a monitor, a television, or a projector, in various examples.

Input/output unit 148 may include a drive, socket, or outlet for receiving computer program product 156, which comprises a computer-readable medium 158 having computer program code 160 stored thereon. For example, computer program product 160 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 158 may include any type of optical, magnetic, or other physical medium that physically encodes program code 160 as a binary series of different physical states in each unit of memory that, when read by computing device 136, induces a physical signal that is read by processor unit 140 that corresponds to the physical states of the basic data storage elements of computer-readable medium 158, and that induces corresponding changes in the physical state of processor unit 140. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 140, thereby physically causing or configuring processor unit 140 to generate physical outputs that correspond to the computer-executable instructions, in a way that causes computing device 136 to physically assume new capabilities that it did not have until its physical state was changed by loading the executable instructions comprised in program code 156.

In some illustrative examples, program code 160 may be downloaded over a network to data storage 150 from another device or computer system for use within computing device 136. Program code 160 comprising computer-executable instructions may be communicated or transferred to computing device 136 from computer-readable medium 102 through a hard-line or wireless communications link to communications unit 146 and/or through a connection to input/output unit 148. Computer-readable medium 158 comprising program code 160 may be located at a separate or remote location from computing device 136, and may be located anywhere, including at any remote geographical location anywhere in the world, and may relay program code 160 to computing device 136 over any type of one or more communication links, such as the Internet and/or other packet data networks. The program code 160 may be transmitted over a wireless Internet connection, or over a shorter-range direct wireless connection such as wireless LAN, Bluetooth, or an infrared connection, for example. Any other wireless or remote communication protocol may also be used in other implementations.

The communications link and/or the connection may include wired and/or wireless connections in various illustrative examples, and program code 160 may be transmitted from a source computer-readable medium 158 over non-tangible media, such as communications links or wireless transmissions containing the program code 160. Program code 160 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 136.

The example techniques described in this disclosure may be a computing device, a method, and/or a computer program product. The computer program product may include a computer readable storage medium (or media) having computer readable program instructions thereon for causing a processor to carry out aspects of one or more examples described in this disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (e.g., network 114), for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of one or more examples described in this disclosure.

Aspects of the disclosure are described herein with reference to flowchart illustrations and/or block diagrams of methods, apparatus (systems), and computer program products according to one or more examples. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various examples of this disclosure. In this regard, each block in the flowchart or block diagrams may represent a module, segment, or portion of instructions, which comprises one or more executable instructions for implementing the specified logical function (s). In some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present disclosure has been presented for purposes of illustration and description and is not intended to be exhaustive or limited to the disclosure in the form disclosed. Many modifications and variations will be understood by persons of ordinary skill in the art based on the concepts disclosed herein. The particular examples described were chosen and disclosed in order to explain the techniques described in the disclosure and example practical applications, and to enable others of ordinary skill in the art to understand the disclosure for various examples with various modifications as are suited to the particular use contemplated. The various examples described herein are within the scope of the following claims.

The invention claimed is:

1. A computing device comprising:
memory configured to store blocks of an enterprise delivery blockchain, wherein a block of the enterprise delivery blockchain includes an acceptance report indicating adherence to a contractual agreement, including operability of a product in a service provided by a service provider; and
a processor configured to:
access the block in the enterprise delivery blockchain;
retrieve the acceptance report from the block in the enterprise delivery blockchain;
determine an identifier, identified in the block in the enterprise delivery blockchain, to a block in an acceptance blockchain;
access the block in the acceptance blockchain via the determined identifier;
retrieve, from the block in the acceptance blockchain, contextual information of the acceptance report, wherein retrieving the contextual information comprises retrieving information indicative of how many times a product acceptance criterion within the acceptance report has been evaluated to be of sufficient quality to be accepted;
output the acceptance report and contextual information of the acceptance report to a client of the service provider;
receive, from the client, feedback related to whether the acceptance report provides sufficient information for the client to determine whether the product adheres to the contractual agreement; and
add the feedback to the contextual information.

2. The device of claim 1, wherein the identifier comprises a first identifier, and wherein the processor is further configured to:
determine a second identifier, identified in the block in the enterprise delivery blockchain, to a block in a product blockchain;
access the block in the product blockchain via the determined second identifier;
retrieve from the block in the product blockchain information indicative of the product in the service; and
output the information indicative of the product in the service.

3. The device of claim 1, wherein retrieving from the block in the acceptance blockchain contextual information of the acceptance report further comprises retrieving, from the block in the acceptance blockchain, information indicative of the product acceptance criterion or how many times the product acceptance criterion has been approved.

4. The device of claim 1, wherein the processor is further configured to:
receive information indicating updates to the contextual information of the acceptance report; and
output information indicating the updates to the contextual information for causing another block to be added to the acceptance blockchain that includes the updated contextual information.

5. The device of claim 1, wherein the enterprise delivery blockchain is separate from the acceptance blockchain.

6. The device of claim 1, wherein the enterprise delivery blockchain is a private blockchain accessible by a first set of entities to access the acceptance report, wherein the acceptance blockchain is a public blockchain accessible by a second set of entities to provide contextual information related to the acceptance report, wherein the second set of entities includes all of the first set of entities and one or more entities not in the first set of entities.

7. The device of claim 1, wherein to access the block in the enterprise delivery blockchain, the processor is further configured to:
output a request via a network to one or more computing devices; and
responsive to the request, receive access to the block in the enterprise delivery blockchain.

8. The device of claim 1, wherein to access the block in the acceptance blockchain, the processor is further configured to:
output a request via a network to one or more computing devices; and
responsive to the request, receive access to the block in the acceptance blockchain.

9. A method comprising:
storing, in memory, blocks of an enterprise delivery blockchain, wherein a block of the enterprise delivery blockchain includes an acceptance report indicating adherence to a contractual agreement, including operability of a product in a service provided by a service provider;
accessing, with a processor, the block in the enterprise delivery blockchain;
retrieving, with the processor, the acceptance report from the block in the enterprise delivery blockchain;
determining an identifier, identified in the block in the enterprise delivery blockchain, to a block in an acceptance blockchain;
accessing the block in the acceptance blockchain via the determined identifier;
retrieving, from the block in the acceptance blockchain, contextual information of the acceptance report, wherein retrieving the contextual information comprises retrieving information indicative of how many times a product acceptance criterion within the acceptance report has been evaluated to be of sufficient quality to be accepted;
outputting the acceptance report and contextual information of the acceptance report to a client of the service provider;
receiving, from the client, feedback related to whether the acceptance report provides sufficient information for the client to determine whether the product adheres to the contractual agreement; and
adding the feedback to the contextual information.

10. The method of claim 9, wherein the identifier comprises a first identifier, the method further comprising:
determining a second identifier, identified in the block in the enterprise delivery blockchain, to a block in a product blockchain;
accessing the block in the product blockchain via the determined second identifier;
retrieving from the block in the product blockchain information indicative of the product in the service; and
outputting the information indicative of the product in the service.

11. The method of claim 9, wherein retrieving, from the block in the acceptance blockchain, contextual information of the acceptance report comprises retrieving, from the block in the acceptance blockchain, information indicative of the product acceptance criterion or how many times the product acceptance criterion has been used.

12. The method of claim 9, further comprising:
receiving information indicating updates to the contextual information of the acceptance report; and
outputting information indicating the updates to the contextual information for causing another block to be added to the acceptance blockchain that includes the updated contextual information.

13. The method of claim 9, wherein the enterprise delivery blockchain is separate from the acceptance blockchain.

14. The method of claim 9, wherein the enterprise delivery blockchain is a private blockchain accessible by a first set of entities to access the acceptance report, wherein the acceptance blockchain is a public blockchain accessible by a second set of entities to provide contextual information related to the acceptance report, wherein the second set of entities includes all of the first set of entities and one or more entities not in the first set of entities.

15. The method of claim 9, wherein accessing the block in the enterprise delivery blockchain comprises:
outputting a request via a network to one or more computing devices; and
responsive to the request, receiving access to the block in the enterprise delivery blockchain.

16. The method of claim 9, wherein accessing the block in the acceptance blockchain comprises:
outputting a request via a network to one or more computing devices; and
responsive to the request, receiving access to the block in the acceptance blockchain.

17. A computer program product comprising a computer readable storage medium having program code embodied therewith, the program code executable by at least one processor to:
access a block of blocks in an enterprise delivery blockchain stored in memory, wherein the block of the enterprise delivery blockchain includes an acceptance report indicating adherence to a contractual agreement, including operability of a product in a service provided by a service provider;
retrieve the acceptance report from the block in the enterprise delivery blockchain;
determine an identifier, identified in the block in the enterprise delivery blockchain, to a block in an acceptance blockchain;
access the block in the acceptance blockchain via the determined identifier;
retrieve, from the block in the acceptance blockchain, contextual information of the acceptance report, wherein retrieving the contextual information comprises information indicative of one or more product acceptance criteria, information indicative of how many times the product acceptance criteria has been used, and information indicative of how many times a product acceptance criterion within the acceptance report has been evaluated to be of sufficient quality to be accepted;
output the acceptance report and contextual information of the acceptance report to a client of the service provider;
receive, from the client, feedback related to the quality of the acceptance report, wherein the quality of the acceptance report relates to whether acceptance report provides sufficient information for the client to determine whether the product adheres to the contractual agreement; and
add the feedback to the contextual information.

18. The computer program product of claim 17, wherein the identifier comprises a first identifier, the program code is further executable by the at least one processor to:
determine a second identifier, identified in the block in the enterprise delivery blockchain, to a block in a product blockchain;
access the block in the product blockchain via the determined second identifier;
retrieve from the block in the product blockchain information indicative of the product in the service; and
output the information indicative of the product in the service.

19. The computer program product of claim 17, wherein the program code is further executable by the at least one processor to:
receive information indicating updates to the contextual information of the acceptance report; and
output information indicating the updates to the contextual information for causing another block to be added to the acceptance blockchain that includes the updated contextual information.

20. The computer program product of claim 17, wherein the enterprise delivery blockchain is separate from the acceptance blockchain.

21. The computer program product of claim 17, wherein the enterprise delivery blockchain is a private blockchain accessible by a first set of entities to access the acceptance report, wherein the acceptance blockchain is a public blockchain accessible by a second set of entities to provide contextual information related to the acceptance report, wherein the second set of entities includes all of the first set of entities and one or more entities not in the first set of entities.

22. The computer program product of claim 17, wherein the program code executable by the at least one processor to access the block in the enterprise delivery blockchain comprises program code executable by the at least one processor to:
output a request via a network to one or more computing devices; and
responsive to the request, receive access to the block in the enterprise delivery blockchain.

23. The computer program product of claim 17, wherein the program code executable by the at least one processor to access the block in the enterprise delivery blockchain comprises program code executable by the at least one processor to:
output a request via a network to one or more computing devices; and
responsive to the request, receive access to the block in the acceptance blockchain.

* * * * *